(12) United States Patent
Mullen et al.

(10) Patent No.: US 9,823,355 B2
(45) Date of Patent: Nov. 21, 2017

(54) METHOD AND APPARATUS FOR BISTATIC LASER RANGE IMAGING

(71) Applicants: Linda Mullen, Chesapeake Beach, MD (US); Brandon Cochenour, Prince Frederick, MD (US); Derek Alley, Odenton, MD (US)

(72) Inventors: Linda Mullen, Chesapeake Beach, MD (US); Brandon Cochenour, Prince Frederick, MD (US); Derek Alley, Odenton, MD (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 331 days.

(21) Appl. No.: 14/848,510

(22) Filed: Sep. 9, 2015

(65) Prior Publication Data

US 2017/0067997 A1  Mar. 9, 2017

(51) Int. Cl.
*G01S 17/89* (2006.01)
*G01S 17/00* (2006.01)
*G01S 13/00* (2006.01)

(52) U.S. Cl.
CPC ............ *G01S 17/89* (2013.01); *G01S 17/003* (2013.01)

(58) Field of Classification Search
CPC ....... G01S 17/003; G01S 17/89; G01S 13/003
See application file for complete search history.

(56) References Cited

U.S. PATENT DOCUMENTS

| | | | |
|---|---|---|---|
| 8,373,862 B2 | 2/2013 | Mullen | |
| 2008/0219584 A1* | 9/2008 | Mullen | G01S 7/491 382/264 |
| 2010/0051836 A1* | 3/2010 | Kim | G01S 7/483 250/574 |
| 2016/0377722 A1* | 12/2016 | Lardin | G01S 17/42 356/5.09 |

* cited by examiner

*Primary Examiner* — Eric Bolda
(74) *Attorney, Agent, or Firm* — Mark O. Glut; NAWC AD

(57) ABSTRACT

The present invention is directed to an apparatus and method for bistatic laser range imaging. The apparatus utilizes two light sources, two receivers, a demodulator and an image processor such that a three dimensional image is produced. The method includes generating beams of intensity modulated light, one toward a target, another toward a receiver. The light toward the target reflects from the target toward another receiver. The modulation envelopes of the beams of light are demodulated into components, the components digitized, then decimated, and a three dimensional image is constructed from the digitized components.

5 Claims, 1 Drawing Sheet

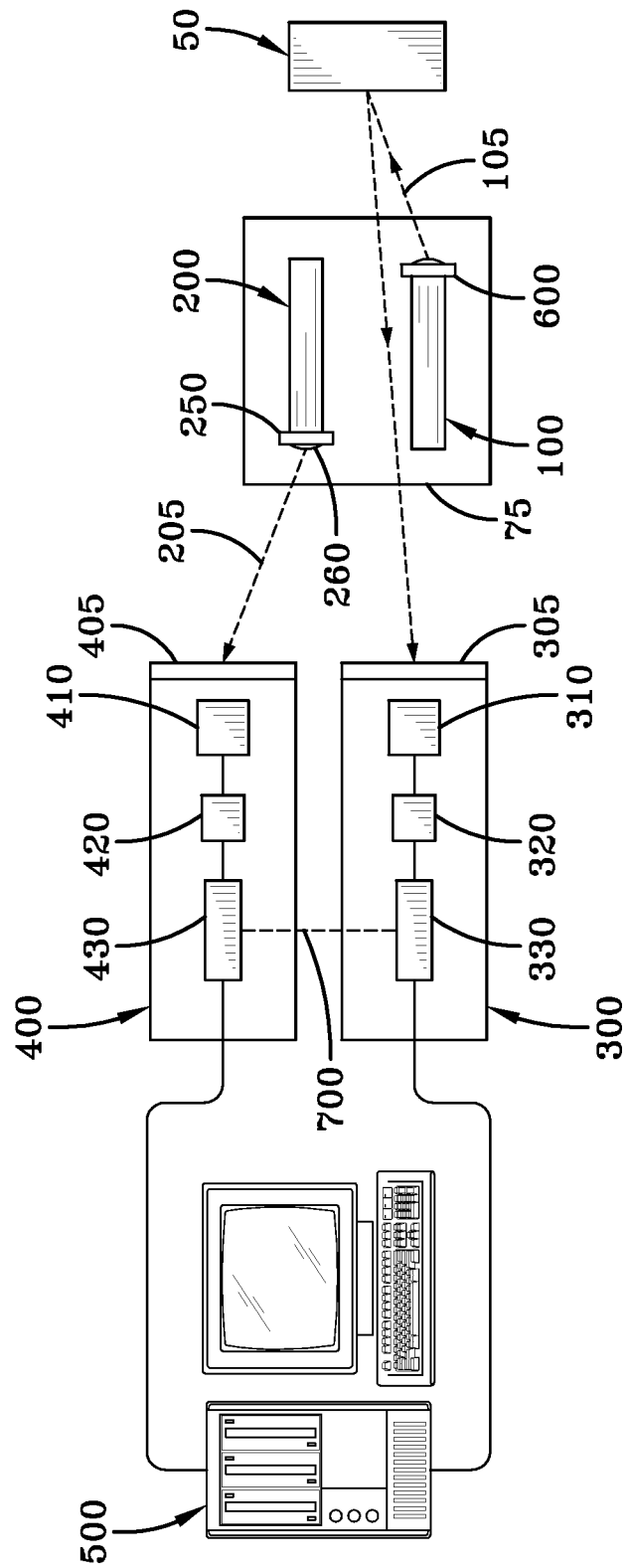

METHOD AND APPARATUS FOR BISTATIC LASER RANGE IMAGING

STATEMENT OF GOVERNMENT INTEREST

The invention described herein may be manufactured and used by or for the Government of the United States of America for governmental purposes without payment of any royalties thereon or therefor.

BACKGROUND

Turbid media is media in which light scattering by constituent or generated irregular (randomly distributed) optical nonuniformities is of significant intensity. Scattering in turbid media leads to a change in the initial direction of the light irradiating the media. Examples of turbid media, but without limitation, include murky ocean water, atmospheric clouds, dust, sand, and biological tissue. While the present invention is directed toward an underwater scenario, the technique can be applied to other turbid media.

Dominance of the undersea environment (a turbid medium) is challenging due to the limitations of existing sensor technology. While radar technology is used extensively above the sea surface for communications, sensing, and navigation, the high absorption of radio frequencies by water prohibits the use of radar in the aquatic environment. Acoustic frequencies have been the preferred method for surveying the underwater environment due to low attenuation and long range propagation. However, acoustic techniques are limited in their ability to provide high resolution imagery for identification tasks, and acoustic frequencies cannot penetrate the air-sea interface. Laser-based sensors have been developed to fill in these performance gaps and have been integrated into both above-water and below-water platforms for underwater mine countermeasures. However, the size, weight, and power of these sensors are not compatible with small, unmanned and autonomous underwater vehicles that are being developed for undersea surveillance. This is primarily due to the fact that these existing systems incorporate transmitter and receiver hardware on the same platform.

To improve the compatibility of laser-based sensors with unmanned and autonomous subsea vehicles, researchers at the United States Navy have developed a technique where the transmitter and receiver are located on separate platforms ("Extended Range Optical Imaging System for Use in Turbid Media," U.S. Pat. No. 8,373,862, issued. Feb. 12, 2013. This patent is hereby incorporated by reference, but not admitted to be prior art with respect to the present invention). This unique bistatic geometry enables the transmitter to optimize its distance from the object of interest so that the amount of light scattered on the path to the scene is minimized. As the source scans the underwater object, a time-varying intensity signal corresponding to reflectivity changes in the object is detected by the distant receiver. This time-varying intensity signal is not adversely affected by scattering on its path from the object. Since the laser illuminates only a small portion of the object of interest at a time, all the light that is reflected by the scene at each scan position carries useable information about the object. Thus, the receiver can collect all the light reflected by each pixel in the scene—even the light that is scattered multiple times on its path to the receiver—and still produce high quality images over large distances. To synchronize the laser and receiver, the laser is temporally encoded with information concerning the scan, such as scan rate, scan angles, etc., and the receiver decodes and uses this information to reconstruct the underwater image. The strength of this approach is that the transmitter and receiver are entirely autonomous and are linked only via a wireless communication signal that is carried by the light scattered from the object and from the environment Previous laboratory and in-situ experiments were conducted with the bistatic configuration and demonstrated the ability of the approach to collect high resolution imagery at up to 20 attenuation lengths between the receiver and underwater object. This previous approach was limited to collecting amplitude-only imagery. In order to measure range, the receiver must have a reference signal that is stable in time (phase locked) to the signal that is transmitted to and reflected from a scene of interest. The range is then measured by comparing the time delay of the scene-reflected signal to this reference signal. In the more conventional optical imaging approach where the transmitter and receiver are located on the same platform, this reference signal can be generated by sampling the transmitted signal (or the signal that modulates the laser). However, when the transmitter and receiver are on separate platforms with no connection between them, sharing a common reference becomes a challenge.

SUMMARY

The present invention is directed to a method and an apparatus that meets the needs enumerated above and below.

The present invention is directed to an apparatus for bistatic laser range imaging (or an apparatus for optically imaging a target in turbid medium) utilizing two light sources, two receivers, a demodulator, and an image processor such that a three dimensional image is produced.

It is a feature of the present invention to provide an apparatus and method for bistatic laser range imaging that can collect both two dimensional and three dimensional imagery, particularly underwater imagery.

It is a feature of the present invention to provide an apparatus and method for bistatic laser range imaging in a turbid medium that allows an image to be created.

It is a feature of the present invention to provide an apparatus and method for bistatic laser range imaging in a turbid medium that has the receiver and the transmitter on different platforms.

DRAWINGS

These and other features, aspects and advantages of the present invention will become better understood with reference to the following description and appended claims, and accompanying drawing wherein:

FIG. 1 is a block diagram of the apparatus for bistatic laser range imaging.

DESCRIPTION

The preferred embodiments of the present invention are illustrated by way of example below and in FIG. 1. The method for bistatic laser range imaging of a target (or optically imaging a target in a turbid medium), includes the steps of placing a first light source near close proximity to the target; generating a first beam of intensity modulated light from the first light source toward the target; scanning the first beam of intensity modulated light over the target; detecting the first beam of intensity modulated light reflected from the target by a first receiver having an optical filter matched to the optical wavelength of the first beam; generating a second beam of intensity modulated light from a second light source toward a second receiver, the first beam and the second beam having different optical wavelengths but being phase locked with respect to their intensity modulation; detecting the second beam of intensity modulated light by the second receiver having an optical filter matched to the optical wavelength of the second beam; phase locking two receiver demodulators via a common reference signal; demodulating modulation envelopes of the first beam and the second beam into in-phase and quadrature phase components via the two phase locked receiver demodulators; digitizing the components; decimating the digitized components; computing magnitudes and phases of the first beam and the second beam; calculating relative phase differences between the first beam and the second beam; and, constructing a three dimensional image from the digitized components.

In the description of the present invention, the invention will be discussed in an aircraft and ship environment; however, this invention can be utilized for any type of application that requires use of an imaging system for use in turbid media. The invention may be utilized for any underwater searches, any data collection purposes, or any related purposes.

As seen in FIG. 1, the apparatus includes two light sources 100, 200, two receivers 300, 400, a demodulator 330, 430, and an image processor 500. The two light sources are a first light source 100 for generating a first beam of intensity modulated light 105 and a second light source 200 for generating a second beam of intensity modulated light 205. The first beam 105 is for scanning the target 50, while the second beam 205 acts as a reference signal. The first beam 105 and the second beam 205 are of different optical wavelengths. The two receivers are a first receiver 300 and a second receiver 400. The first receiver 300 is for receiving the first beam 105 after it has reflected from the target 50, and has a first filter 305 such that it is matched to the optical wavelength of the first beam 105. The second receiver 400 is for receiving the second beam 205, and has a second filter 405 that is matched to the optical wavelength of second beam 205. As shown in FIG. 1, in the preferred embodiment, each receiver 300, 400 includes a demodulator 330, 430. The first receiver 300 includes a first demodulator 330, while the second receiver 400 includes a second demodulator 430. The demodulator(s) 330, 430 are for demodulating modulation envelopes of the reflected first beam 105 (performed by a first demodulator 330) and the second beam 205 (performed by a second demodulator 430) into in-phase (I) and quadrature (Q) components, for digitizing the components, and for decimating the digitized components. The image processor or converter 500 is for converting the decimated digitized components into a 3D image.

The light sources or lasers 100, 200 generate intensity modulated light. Intensity modulated light may be defined, but without limitation, as variations in the intensity of light as a function of time that is controlled by varying the drive current (for a laser diode) or by transmitting the light through an external modulator (for a solid state laser). The variations in light intensity are encoded with information by varying the modulation frequency (FSK, frequency shift keying) or modulation phase (PSK, phase shift keying).

In the preferred embodiment, the first light source 100 and the second light source 200 may be disposed in a housing 75. The optimal wavelengths of the beams of light 105, 205 are in the blue/green wavelength; however, other colors such as red or infrared may be utilized, especially for above-water environments. In the preferred embodiment, the first beam 105 of light is in the green light wavelength, while the second beam 205 of light is in the blue light wavelength. The two light sources may be laser diode sources: a green (514 nm) laser 100 and a blue (488 nm) laser 200. The green laser 100 may illuminate the object 50 in the turbid media (or underwater object) via an x/y galvo scanner 600. The blue laser 200 may be directed towards a diffuser 250 and a window 260 in the back of the housing 75. The two light source 100, 200 are modulated by the same digital direct synthesis source; therefore, the modulation envelopes of the beams are inherently phase-locked. Therefore, the difference in transit time between the two light sources 100, 200 can be used to measure range from the transmitter to the object.

The first receiver 300 and the second receiver 400 may both be two photomultiplier tube receivers, and may be configured into one receiver. The first receiver 300 includes a first photomultiplier tube 310, while the second receiver 400 includes a second photomultiplier tube 410. In the preferred embodiment, the first receiver 300 includes a 514 nm optical filter 305, while the second receiver 400 includes a 488 nm optical filter 405. Once received by their respective receivers, the modulation envelopes are split into their DC and RF components via a bias-tee 320, 420. A bias-tee is, but without limitation, may be defined as a component which separates the DC-coupled (through an inductor) and AC-coupled components (through a capacitor) of the detected signal. As shown in FIG. 1, the first receiver 300 includes a first bias tee 320, while the second receiver 400 includes a second bias tee 420. The RF component of each of the modulation envelopes are demodulated into their in-phase (I) and quadrature (Q) components via the demodulator. In the preferred embodiment, the demodulator is two software defined radios (SDRs), such as universal software radio peripheral devices (USRP). The first receiver 300 includes a first SDR 330, while the second receiver 400 includes a second SDR 430. In the preferred embodiment, the first SDR 330 and the second SDR 430 are phase locked via an identical timing reference signal 700. The RF components are then digitized and decimated (throwing a portion of the samples away to reduce the data rate) based upon the desired bandwidth by the SDR and then transmitted to an image processor or converter 500 that makes a three dimensional image of the target. The image processor or converter 500 may be a computer, field programmable gate array, or any similar device.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. The method for optically imaging a target in a turbid medium, includes the steps of:
   placing a first light source near close proximity to the target; generating a first beam of intensity modulated light from the first light source toward the target, the first beam of intensity modulated light having an optical wavelength;
   scanning the first beam of intensity modulated light over the target;

detecting the first beam of intensity modulated light reflected from the target by a first receiver having an optical filter matched to the optical wavelength of the first beam;

generating a second beam of intensity modulated light from a second light source toward a second receiver, the second beam of intensity modulated light having an optical wavelength, the first beam of intensity modulated light and the second beam of intensity modulated light having different optical wavelengths;

detecting the second beam of intensity modulated light by the second receiver, the second receiver having an optical filter matched to the wavelength of the second beam of intensity modulated light;

phase locking two receiver demodulators via a common reference signal;

demodulating modulation envelopes of the first beam of intensity modulated light and the second beam of intensity modulated light into in-phase and quadrature phase components via the two phase locked receiver demodulators;

digitizing the components;

decimating the digitized components;

computing magnitudes and phases of the first beam of intensity modulated light and the second beam of intensity modulated light;

calculating relative phase differences between the modulation envelopes of the first beam of intensity modulated light and the second beam of intensity modulated light; and, constructing a three dimensional image from the digitized components.

2. An apparatus to optically image a target in turbid media, the apparatus comprising:

a first light source for generating a first beam of intensity modulated light, the first beam is for scanning the target;

a second light source for generating a second beam of intensity modulated light, the first beam and the second beam having different optical wavelengths, the second beam to act as a reference signal;

a first receiver for receiving the first beam after it has reflected from the target, the first receiver having a first filter such that it is matched to the optical wavelength of the first beam, a second receiver for receiving the second beam, the second receiver having a second filter that is matched to the optical wavelength of the second beam;

a demodulator for demodulating modulation envelopes of the reflected first beam and the second beam into in-phase (I) and quadrature (Q) components, for digitizing the components, and for decimating the digitized components; and, an image processor for converting the decimated digitized components into a 3D image.

3. The apparatus of claim 2, wherein the apparatus includes a first demodulator for demodulating the modulation envelope of the first beam, and a second demodulator for demodulating the modulation envelope of the second beam.

4. The apparatus of claim 3, wherein the apparatus further includes a first-bias tee for splitting the modulation envelope of the first beam into DC and RF components, and a second bias-tee for splitting the modulation envelope of the second beam into DC and RF components.

5. The apparatus of claim 4, wherein the demodulator is a first software defined radio for demodulating the RF component of the first beam into in-phase and quadrature components and a second software defined radio for demodulating the RF component of the second beam into in-phase and quadrature components, the first software defined radio and the second software defined radio are phase-locked.

\* \* \* \* \*